Patented Aug. 9, 1927.

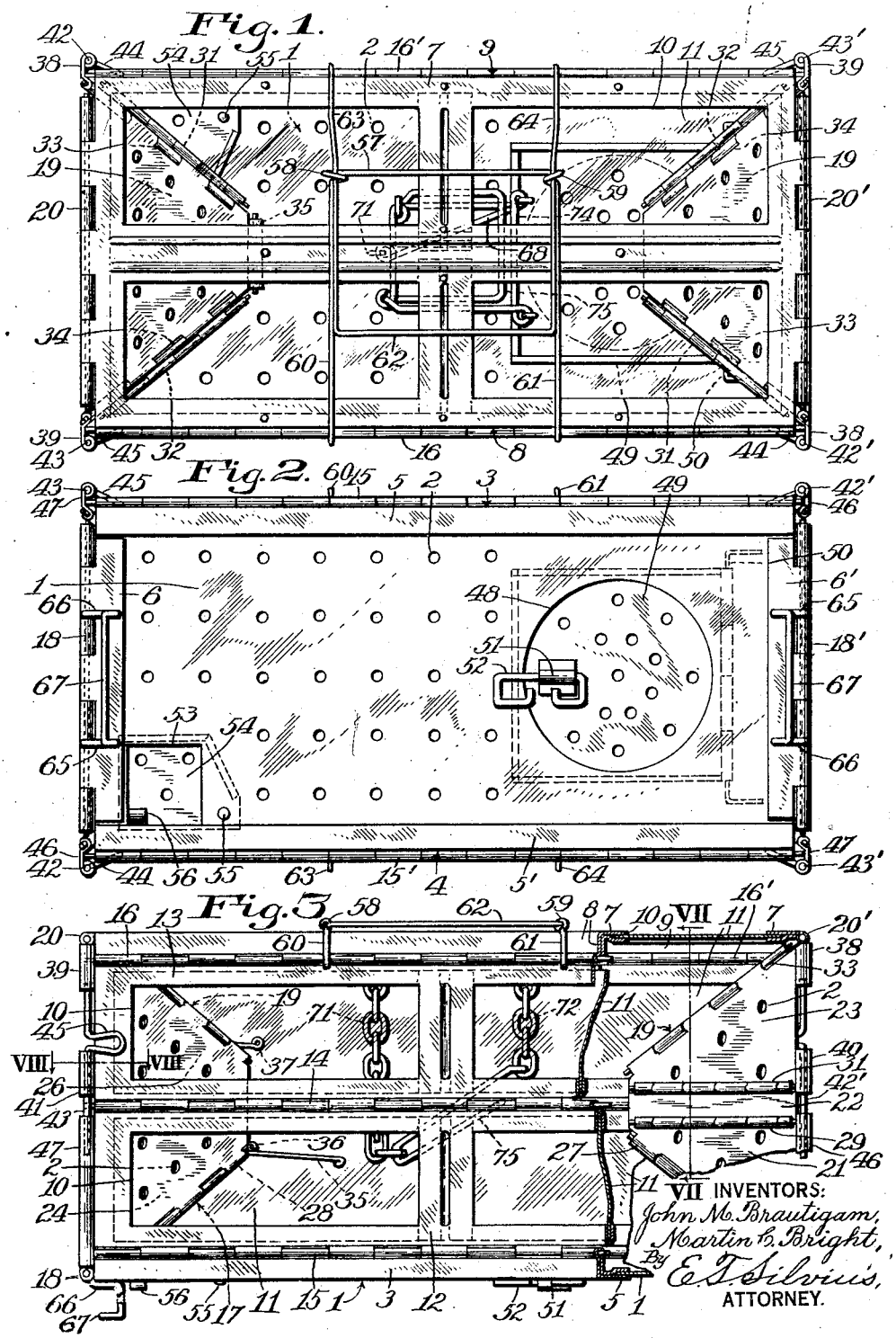

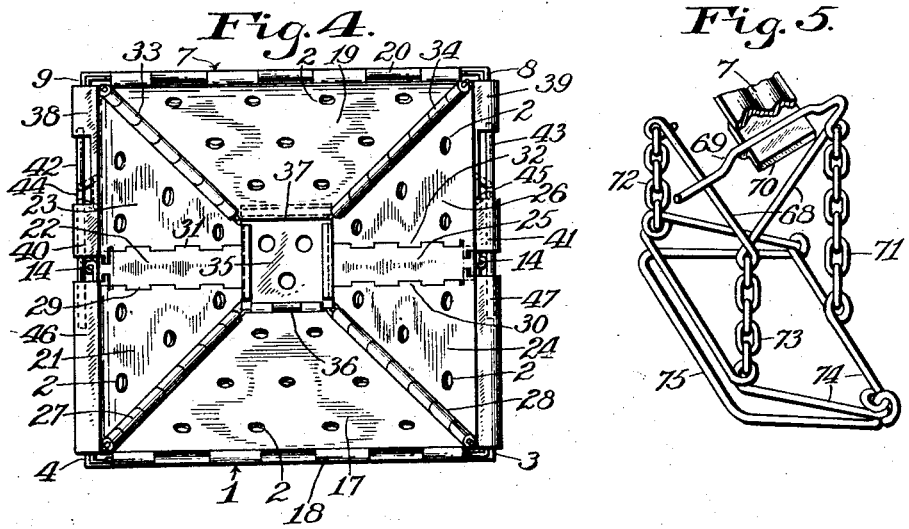
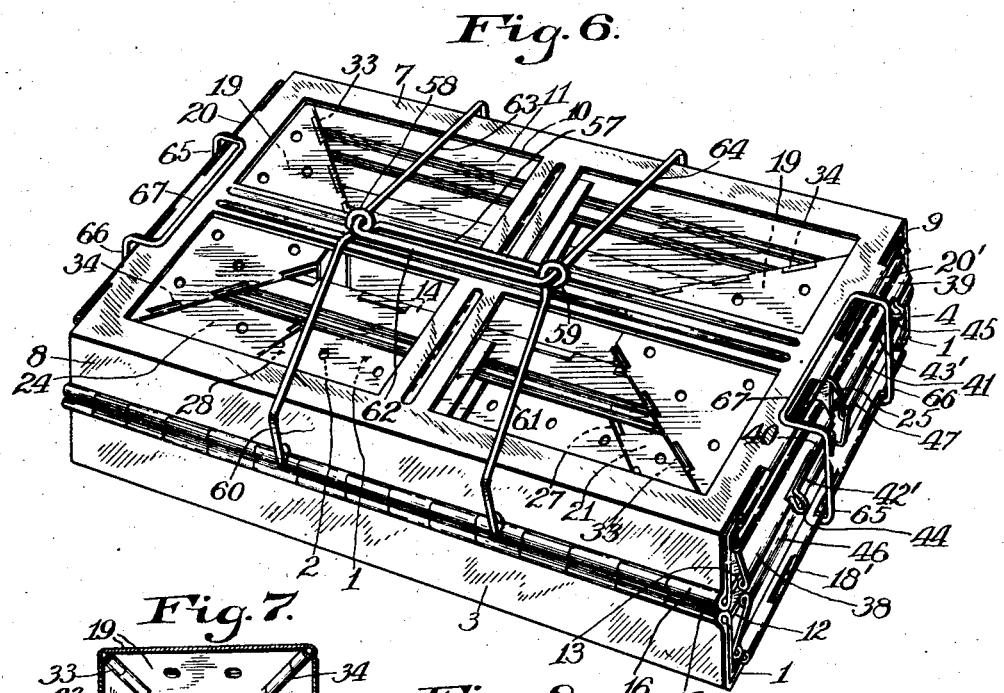
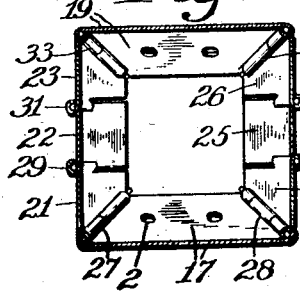
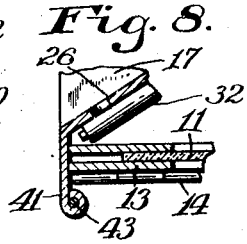

1,638,238

UNITED STATES PATENT OFFICE.

JOHN M. BRAUTIGAM AND MARTIN C. BRIGHT, OF INDIANAPOLIS, INDIANA.

SECTIONAL FOLDING MINNOW TRAP.

Application filed July 24, 1925. Serial No. 45,832.

This invention relates to a minnow trap of the type that is designed to be compactly folded so as to require only a small space for carrying it on a fishing trip or when not required for use, being generally similar to that shown in an application for a patent filed July 12, 1923 (which has resulted in Patent No. 1,544,213, issued June 30, 1925), the invention having reference more particularly to improvements in such type of minnow trap.

An object of the invention is to provide an improved folding minnow trap which shall be so constructed as to enable it to be readily folded compactly and unfolded, and not require complicated manipulation of parts thereof.

Another object is to provide an improved light weight folding minnow trap of such construction as to be adapted to be expeditiously manufactured at moderate cost, and which shall permit repairs to be cheaply made in case of accidental damage thereto.

A further object is to provide an improved sectional folding minnow trap which shall have all parts thereof connected together, to eliminate trouble and annoyance which might result from misplacement of separate parts of the structure.

A still further object is to provide improved handling and retaining devices for minnow traps of the above-described character, including means for baiting the minnow trap, and provision for retaining minnows alive therein and permitting selection of minnows when required for use, which minnow trap shall be efficient, durable and economical.

With the above-mentioned and other objects in view, the invention consists in a collapsible minnow trap having novel parts connected together in a novel manner to permit compact folding thereof into convenient and attractive form; the invention consisting also further in certain novel parts and in the combinations and arrangements of parts as hereinafter particularly described and further set forth in the accompanying claims.

Referring to the drawings,—Figure 1 is a top plan of the improved minnow trap as preferably constructed; Fig. 2 is a bottom plan of Fig. 1; Fig. 3 is a side elevation of the minnow trap partially broken away, with portions in section; Fig. 4 is an end elevation in which the central opening for the passage of minnows is temporarily closed by a door; Fig. 5 is a perspective view of a type of bait holder to be removably connected to the inner side of the minnow trap; Fig. 6 is a perspective view of the minnow trap appearing as when folded for carrying by hand; Fig. 7 is a fragmentary section approximately on the line VII—VII in Fig. 3; and Fig. 8 is a fragmentary section approximately on the line VIII—VIII in Fig. 3 on an enlarged scale.

In the different figures of the drawings similar reference characters indicate corresponding elements or features of construction herein referred to in detail.

A practical embodiment of the invention comprises a sheet metal bottom 1 having perforations 2 permitting passage of water, the bottom having up-turned flanges 3 and 4 to constitute side members which may be integral with the main portion of the bottom or may be integral with hinge plates 5 and 5' attached to opposite edge portions thereof, in some cases the bottom having hinge plates 6 and 6' attached to the shorter end portions of the bottom. The structure has an improved top comprising a frame plate 7 having down-turned flanges 8 and 9 on the longer edges thereof constituting side members. The frame plate 7 has a suitable number of window openings 10 therein that are provided with transparent or semi-transparent panels 11 which may be composed of celluloid. Each of the opposite side walls of the trap is composed of two sections preferably consisting of frames 12 and 13 connected together by a hinge structure 14, the frame 12 being connected to a side member 3 or 4 by means of a hinge structure 15, the frame 13 being connected to an opposite side member 8 or 9 by means of a hinge structure 16. Each frame 12 and 13 has also the openings 10 and panels 11. The pintles or rods of the hinge structures 14, 15 and 16 are outside the planes of the side structures to permit the sections to fold symmetrically inward each towards the other.

Improved ends are provided for the minnow trap, the ends being approximately funnel-shaped to guide swimming minnows into the trap. Each end structure is composed of a lower section 17 connected to the bottom 1 by means of a hinge structure 18 for one end and a hinge structure 18' for the opposite end, and an upper section 19 connected to the top frame 7 by means of a hinge structure 20 for one end and a hinge structure 20' for the opposite end, each section being approximately triangular in plan and extending inwardly and convergently each towards the other. Each side section of each end is also approximately triangular in plan and is foldable, one section having a triangular main part 21, a middle part 22 of uniform width and a triangular main part 23, the opposite side section comprising similar parts 24, 25 and 26 corresponding to the opposite side section. The part 21 is connected to the section 17 by means of a hinge structure 27 and the part 24 is connected also to the part 17 by means of a hinge structure 28, these hinge structures being mainly on the inner side of the funnel-like end structure. The middle parts 22 and 25 are connected to the parts 21 and 24 by means of hinge structures 29 and 30 respectively and to the parts 23 and 26 by means of hinge structures 31 and 32 respectively, these hinge structures being mainly on the opposite outer side of the funnel-like end, so that the main parts of each side section shall be connected together by a double hinge, the middle section constituting a spreader to separate the two folding lines so that clear space is provided to receive the hinge structure 14 when the sides are folded into the ends of the minnow trap. The main parts 23 and 26 are connected to the upper section 19 by means of hinge structures 33 and 34 respectively which are arranged mainly inside the funnel-like end. Each end has a central opening, and one of the openings preferably is provided with a shutter 35 which is connected by means of a hinge 36 to the section 17 at the bottom of the opening, the shutter being provided with a latch 37 which is connected to the upper section 19 to hold the shutter in closed position.

The minnow trap is provided with improved means for locking the folding parts thereof in normal position, the end section parts 23 and 26 having bolt guides 38 and 39 on their upper portions and similar guides 40 and 41 on their lower portions, the guides being integral with the end parts and extending outward to constitute corner pieces at the ends of the sides of the trap. A bolt 42 or bolt 42' is slidingly supported in the guides 38 and 40 and a similar lock bolt 43 or bolt 43' is arranged in the guides 39 and 41, the bolts having handles 44 and 45 respectively that are arranged each between the upper and lower guides. Each part 21 has a keeper 46 to receive the bolt 42 and the part 24 has a keeper 47 to receive the bolt 43, the keepers being in alinement with the bolt guides and similarly shaped and arranged relatively to the side sections.

The bottom of the trap has a hand-hole 48 adjacent to one end thereof which is normally closed by a door 49 arranged on the inner side of the bottom and connected thereto by means of a hinge 50 arranged between the hand-hole and adjacent end of the bottom, to permit the door to swing inwardly, the door being provided with a casing 51 on its outer side in which a bolt 52 is slidably supported to be engaged with the outer side of the trap bottom to hold the door in closed position.

The bottom of the trap preferably has a small opening 53 adjacent to one corner thereof which normally is covered by a shutter 54 arranged on the inner side of the bottom and connected thereto by means of a pivot 55, the shutter having a handle 56 for moving the shutter.

An improved folding handle is provided and centrally arranged upon the top of the trap, and comprises a handle bar 57 having rings 58 and 59 integrally formed on the opposite ends thereof, and rods 60 and 61 made integrally with the rings and connected with the hinge structure 16, the rods being bent over the adjacent edge of the top frame 7, the handle comprising also a handle bar 62 having rods 63 and 64 loosely arranged in the rings respectively and extending thence over the opposite edge of the top frame and connected with the hinge structure 16', the handle bars being brought together so that the rings are stopped against the handle bar 62 when the handle is lifted to unfolded position for use.

A pair of clasps preferably are provided for binding the compactly folded trap, each clasp comprising wire rods 65 and 66 spaced apart and pivotally connected to the trap body—at one end with the hinge structure 18, and at the opposite end with the hinge structure 18', each clasp having a binding and handle portion 67 designed to engage the top frame 7 when the rods are swung up against the folded end parts of the trap. The clasps being open between their side rods, may conveniently be used for carrying the folded trap, and for handling the trap when unfolded, or for anchoring the trap in a stream.

Preferably the minnow trap is provided with a bait holder which may comprise a wire frame 68 having a supporting pin 69 to be engaged with a clasp member 70 attached to the inner side of the central portion of the top frame 7, the frame 68 carrying chains 71, 72 and 73 to which a clamp frame 74 is connected which has a spring clamp 75 connected thereto to hold bait whereby to attract minnows and induce them to enter the trap. The bait holder, being collapsible, becomes folded automatically when the top of the trap is lowered towards the trap bottom.

In practical use, the minnow trap having been unfolded and locked to hold the parts in proper position, the shutter 35 being open, the door 49 and the shutter 54 being closed, the trap is placed in water where there are minnows which swim through the openings in the ends of the trap, or into one of the openings if the water is flowing. If the end of the trap having the shutter 35 be placed up stream the shutter may be closed to prevent the minnows from swimming up stream through the upper end of the trap, and the shutter may be closed when the trap is stood on end to retain the trapped minnows alive in water. Access to the inside of the trap may readily be gained through the hand-hole 48, to replenish the bait or to attach or remove the bait holder. Minnows of desirable size for bait may be readily selected and removed through the small opening 53. When the trap is at rest on its bottom the handle is folded down upon the top of the trap by the force of gravitation and thus is not obstructive during transportation of the trap, being readily unfolded for carrying the trap by hand either when the trap is folded or unfolded. After having used the trap and it is desired to fold it the lock bolts are withdrawn from their keepers while the handle is held upward, after which the handle is lowered by hand with the result that the trap collapses as the ends fold inward and the sides fold partly into the folded ends, the shutter 35 becoming automatically unlatched in the operation and falling to open position, if not already open.

What we claim as new is:

1. A sectional folding minnow trap including a bottom and a top, sectional folding sides and folding ends hingedly connected to the bottom and the top, a folding bait holder connected to the top, and a folding handle connected to the top adjacent to the folding sides.

2. A sectional folding minnow trap including a bottom, a top having a clasp member centrally on the inner side thereof, two sectional folding sides and also sectional folding ends hingedly connected to the bottom and the top, and a folding bait holder removably connected with the top and the clasp member.

3. A sectional folding minnow trap including a bottom and a top and also folding sides and ends, and two clasps hinged to opposite ends respectively of the bottom and having each a binding portion to be moved into contact with the top when the minnow trap is folded, each clasp being open to receive a fastener.

4. A sectional folding minnow trap including a bottom, a top, two sectional folding ends hingedly connected to the bottom and the top, the two opposite sides of the ends being each composed of more than two parts hingedly connected together and to the remaining sections of the end, and two sectional folding sides hingedly connected to the bottom and the top.

5. A sectional folding minnow trap including a bottom and a top, two sectional folding ends hingedly connected to the bottom and the top, each of the ends having a central opening, two sectional folding sides hingedly connected to the bottom and the top, and a shutter hinged to one of the folding ends at the bottom of the opening, and provided with a latch to hold the shutter at the top of the opening.

6. A sectional folding minnow trap including a bottom and a top, two sectional folding ends hingedly connected to the bottom and the top, two sectional folding sides hingedly connected to the bottom and the top, and a handle centrally arranged upon the top and connected thereto for unfolding the minnow trap, the minnow trap being automatically collapsible when its bottom is supported and the handle released.

7. A sectional folding minnow trap including a bottom and a top, two sectional ends comprising each a lower and an upper section and two side sections having each a middle part and two main parts hingedly connected together and to the lower and upper sections, the lower section being hinged to the bottom and the upper section hinged to the top of the minnow trap, and two sectional sides hingedly connected to the bottom and the top.

8. A sectional folding minnow trap including a bottom and a top, sectional folding sides and also ends hingedly connected to the bottom and the top, and a handle comprising a handle bar having two rings and two rods extending from the rings and hingedly connected to one side portion of the top, and a handle bar having two rods integral therewith and extending loosely through the rings respectively and hingedly connected to the opposite side portion of the top.

9. A sectional folding minnow trap including a bottom and a top, two sectional folding ends hingedly connected to the bottom and the top, one part of each of the opposite side sections of each of the ends having a bolt guide and a companion part having a keeper normally in alinement with the guide, two sectional folding sides hingedly connected to the bottom and the top, and a plurality of lock bolts slidably supported in the bolt guides respectively and normally extending into the keepers respectively.

10. A sectional folding minnow trap including a bottom and a top and also folding sides and ends, the bottom having a small opening adjacent to one corner thereof and in proximity to one of the folding ends, said one of the ends having a passageway therein provided with a hingedly supported shutter, said end having an inclined section tending to guide to said small opening, and a shutter arranged on the inner side of the trap bottom and pivoted thereto and being provided with a handle extending through the small opening.

11. A sectional folding minnow trap including a bottom and a top and also folding sides and ends, the bottom having a handhole adjacent to one end thereof, one of the folding ends having an opening and being provided with a hinge structure at the bottom of the opening and a latch device at the top of the opening, a shutter connected to the hinge structure to engage the latch device, a door hinged to the inner side of the trap bottom adjacent to the hand-hole, and a lock device mounted on the outer side of the door and normally engaging the outer side of the trap bottom adjacent to the hand-hole.

In testimony whereof, we affix our signatures on the 29th day of June, 1925.

JOHN M. BRAUTIGAM.
MARTIN C. BRIGHT.